(12) United States Patent
Yamawaki et al.

(10) Patent No.: US 6,405,113 B1
(45) Date of Patent: Jun. 11, 2002

(54) VEHICLE BEHAVIOR CONTROL APPARATUS

(75) Inventors: Shigeru Yamawaki; Yasuo Shimizu, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/697,474

(22) Filed: Oct. 26, 2000

(30) Foreign Application Priority Data

Dec. 3, 1999 (JP) .......................................... 11-344118

(51) Int. Cl.⁷ .............................. B61C 15/08; B62D 5/04
(52) U.S. Cl. ........................... 701/41; 701/34; 180/446; 318/52; 280/426; 280/91
(58) Field of Search ..................... 701/41, 34; 280/91, 280/442, 426; 180/402, 446, 140; 303/146, 140; 318/432, 632, 52, 587, 433, 434

(56) References Cited

U.S. PATENT DOCUMENTS

| 4,706,979 | A | * | 11/1987 | Kawabe et al. | 280/91 |
| 5,105,899 | A | * | 4/1992 | Mori et al. | 180/140 |
| 5,265,019 | A | * | 11/1993 | Harara et al. | 701/41 |
| 5,311,956 | A | * | 5/1994 | Sugiyama | 180/140 |
| 5,329,451 | A | * | 7/1994 | Notsu | 701/41 |
| 5,839,799 | A | * | 11/1998 | Fukada | 303/146 |
| 5,884,724 | A | * | 3/1999 | Bhner et al. | 180/402 |
| 6,091,214 | A | * | 7/2000 | Yamawaki et al. | 318/52 |
| 6,144,904 | A | * | 11/2000 | Tsen | 701/34 |
| 6,184,637 | B1 | * | 2/2001 | Yamawaki et al. | 318/432 |
| 6,272,418 | B1 | * | 8/2001 | Shinumura et al. | 701/72 |

FOREIGN PATENT DOCUMENTS

| JP | 11-152057 | 6/1999 | | |
| JP | 411152057 A | * | 6/1999 | B62D/6/00 |

* cited by examiner

Primary Examiner—William A. Cuchlinski, Jr.
Assistant Examiner—Tuan C To
(74) Attorney, Agent, or Firm—Merchant & Gould P.C.

(57) ABSTRACT

A vehicle behavior control apparatus is disclosed. The vehicle behavior control apparatus comprises: a slip angle difference predicting section for predicting a difference between a slip angle of front wheels and a slip angle of rear wheels; a steer angle detecting section for detecting a steer angle of the vehicle; and a control section for controlling turning behaviors of the vehicle, based on an angle difference signal from said slip angle difference predicting section and a steer angle signal from said steer angle detecting section.

6 Claims, 9 Drawing Sheets

Y : YAW RATE

V : VEHICLE SPEED $\delta$ : TURN ANGLE OF FRONT WHEEL $\beta$ : SLIP ANGLE $\beta f$ : FRONT WHEEL SLIP ANGLE $\beta r$ : REAR WHEEL SLIP ANGLE Lf : DISTANCE BETWEEN FRONT AXLE AND C.G.

Lr : DISTANCE BETWEEN REAR AXLE AND C.G.

L : WHEEL BASE $\rho$ : TURNING RADIUS

CG : CENTER OF GRAVITY

VEHICLE BEHAVIOR CONTROL APPARATUS

FIELD OF THE INVENTION

The present invention relates to a vehicle behavior control apparatus for controlling vehicle behaviors, and more particularly, to a vehicle behavior control apparatus for automotive vehicles, which enables to accurately detect the vehicle state, based on a steer angle as an input signal from a driver to the vehicle and a slip angle difference between the front and rear wheels as an output signal of the vehicle.

BACKGROUND OF THE INVENTION

Various apparatus are known for controlling vehicle behaviors. Such apparatus include an electric power steering apparatus, a four wheel steering apparatus, a left-and-right driving force distributing apparatus, and a left-and-right braking force distributing apparatus. Of these apparatus, the electric power steering apparatus informs the driver of road surface information (road reaction force) via a steering wheel, by changing an assist torque, and urges a steering operation of the driver in order to stabilize the vehicle behavior. Besides, in the other apparatus, the vehicle behavior is stabilized by the action from the vehicle. For example, the rear wheels of the vehicle are turned to reduce the deviation of the actual yaw rate with regard to the target yaw rate, in the case of the four wheel steering apparatus, and the distribution of the driving force is changed at the left and right wheels, in the case of the driving force distributing apparatus, and further the distribution of the braking force is changed at the left and right wheels, in the case of the braking force distributing apparatus.

The conventional electric power steering apparatus mainly comprises a steering torque sensor, a control unit, a motor driver, an electric motor and the like. The steering torque sensor detects a manual steering torque to be generated by the driver's steering operation. The control unit transmits a target torque signal for driving the electric motor in accordance with the steering torque, and provides a motor control signal for controlling the drive of the electric motor on the basis of the target torque signal. In order to swiftly convert a motor current flowing into the electric motor into a current corresponding to the target torque signal, the control unit feeds a signal that is corresponding to the motor current actually flowing into the electric motor back to the target torque signal (negative feedback), so as to control the drive of the electric motor. The motor driver is, for example, composed of a bridge circuit including field effect transistors, and in the bridge circuit, it drives the electric motor with PWM (Pulse Width Modulation) on the basis of the motor control signal. The electric motor then rotates and applies an assist torque to the steering system. The electric power steering apparatus corrects the target torque signal by reducing the target torque signal, in proportion to an increasing vehicle velocity due to a velocity signal detected at a velocity sensor. In other words, in a low-velocity driving, the electric power steering apparatus applies a sufficiently large assist torque to the steering system so as to ease the driver's steering operation, while in a high-velocity driving, the electric power steering apparatus applies a small assist torque to the steering system, thereby stabilizing vehicle behaviors.

The applicant also discloses in Japanese Patent Laid-open Publication No. HEI-11-152057 an electric power steering apparatus, which corrects the target torque signal on the basis of the angle difference between the front and rear wheel slip angles of the vehicle. In order to collect vehicle information, this electric power steering apparatus comprises a velocity sensor, a turn angle sensor, a yaw rate sensor, a steering torque sensor, and the like. The electric power steering apparatus further comprises a slip angle difference predicting section and a correcting section in the control unit. The slip angle difference predicting section calculates the slip angle difference between the front and rear wheels, based on a velocity signal from the velocity sensor, a yaw rate signal from the yaw rate sensor, and dimensional parameters of the vehicle, and provides an angle difference signal. The correcting section determines whether the vehicle is in an under steer state or in an over steer state, based on a direction of the angle difference signal and a direction of the yaw rate signal, and sets an appropriate correction amount corresponding to each state. The correcting section also determines the under steer state, the over steer state, or the counter steer state, based on a direction of the angle difference signal, a direction of the differential value of the angle difference signal, a direction of the yaw rate signal, and a direction of the steering wheel torque from the steering wheel torque sensor, and sets an appropriate correction amount corresponding to each state. The correcting section further corrects the correction amount by increasing or decreasing to the target torque signal. The electric power steering apparatus therefore informs the driver of a change of the road reaction force via the steering wheel, by way of changing an assist torque in response to the under steer state, the over steer state, or the counter steer state.

However, in the electric power steering apparatus disclosed in Japanese Patent Laid-open Publication No. HEI-11-152057, while it can judge the under steer state or the over steer state from the angle difference signal, irrespective of a road surface friction coefficient, there may arise a discrepancy between the angle difference signal and the actual vehicle behavior. In other words, when detecting the vehicle state based on the angle difference signal, there is a case in which the vehicle state is not accurately detected.

Generally, in a region where the steer angle (turn angle of the front wheels) is greater, the vehicle is set for under steer (weak under steer). Therefore, when the vehicle is in a condition that the angle difference between the front wheel slip angle and the rear wheel slip angle is 0 (deg), i.e. in the neutral steer state, the vehicle is actually in a shifting or proceeding state just before shifting to the over steer state. As to the vehicle behavior, the under steer state is more stable than the over steer state. The vehicle is thus controlled so as not to be in the over steer state. For this reason, the target torque signal is preferably corrected in the shifting state, for the preparation of the over steer state. Especially in a sport car with smaller yaw inertial mass, the correction of the target torque signal should be made during the shifting state, otherwise the counter operation may not be made in time. In the aforementioned electric power steering apparatus, however, because the steer angle (turn angle of the front wheels) is not employed as a parameter for judging the vehicle states, accurate judging for this shifting state cannot be made. Therefore, this electric power steering apparatus corrects the target torque signal after shifting to the over steer state. Meanwhile, in a region where the steer angle is greater, the yaw rate becomes greater, leading to susceptibility to the over steer condition. For this reason, the target torque signal is preferably corrected swiftly during the shifting from the under steer state to the neutral steer state (conventionally, it is judged as the under steer condition) and as the steer angle is getting greater (i.e., in a region where the absolute value between the front wheel slip angle and the rear wheel slip angle is large).

Further, when the vehicle speed is faster or when the road surface friction coefficient is low, the vehicle tends to shift from the under steer state to a drift out state, due to a decreased lateral force. Especially for a heavy-weighted vehicle with greater yaw inertial mass, the vehicle, is liable to shift to the drift out state. Shifting to the drift out state (excessive under steer state) is determined not only by the angle difference between the front wheel slip angle and the rear wheel slip angle but also by taking the steer angle into consideration. Specifically, the smaller the steer angle, the more likely to shift to the drift out state in a region where the angle difference between the front wheel slip angle and the rear wheel slip angle is smaller. However, because the conventional electric power steering apparatus does not employ steer angle (turn angle of the front wheels) as a parameter to judge the vehicle state, an accurate judgement cannot be made whether or not shifting to the drift out state.

Meanwhile, the four wheel steering apparatus effectively turns the rear wheels, when the vehicle runs straight in which the target yaw rate is small, so as to restrict the actual yaw rate. However, when the target yaw rate is large, the four wheel steering apparatus has to set the turning angle of the rear wheels in accordance with the road surface friction coefficient. For this reason, there is a need for highly accurately detecting the road surface friction coefficient, which involves difficulty in detection of the friction coefficient directly and complicated calculations to predict the friction coefficient. Further, left-and-right driving force distributing apparatus cannot most effectively control the braking force when the yaw rate is greater.

With the foregoing drawbacks of the prior art in view, the present invention seeks to provide a vehicle behavior control apparatus, which accurately detects the vehicle state and controls the vehicle behavior in accordance with the detected vehicle state.

SUMMARY OF THE INVENTION

According to the present invention, there is provided a vehicle behavior control apparatus comprising:
a slip angle difference predicting section for predicting a difference between a slip angle of front wheels and a slip angle of rear wheels;
a steer angle detecting section for detecting a steer angle of the vehicle; and
a control section for controlling turning behaviors of the vehicle, based on an angle difference signal from said slip angle difference predicting section and a steer angle signal from said steer angle detecting section.

With this vehicle behavior control apparatus, the input-output relations of the vehicle are detected by the steer angle signal that is an input signal from the driver to the vehicle and by the angle difference signal that is an output signal from the vehicle, leading to accurate detection of the vehicle state. Therefore, the vehicle behavior control apparatus appropriately controls turning behaviors of the vehicle in accordance with the detected vehicle state.

There is also provided a vehicle behavior control apparatus comprising:
a steering torque sensor for detecting a steering torque of a steering system;
an electric motor for applying an assist torque to the steering system;
a control unit having a target torque signal setting section for setting a target torque signal based on a steering torque signal from said steering torque sensor; and
a motor driver for driving said electric motor based on said target torque signal,
wherein the vehicle behavior control apparatus further comprises a slip angle difference predicting section for predicting a difference between a slip angle of front wheels and a slip angle of rear wheels, and a steer angle detecting section for detecting a steer angle of the vehicle, and said control unit has a correcting section for correcting said target torque signal based on an angle difference signal from said slip angle difference predicting section and a steer angle signal from said steer angle detecting section, so as to control turning behavior of the vehicle.

With this vehicle behavior control apparatus, the input-output relations of the vehicle are detected by the steer angle signal that is an input signal from the driver to the vehicle and by the angle difference signal that is an output signal from the vehicle, leading to accurate detection of the vehicle state. Further, the vehicle behavior control apparatus sets a correction amount at the correcting section, in accordance with the vehicle state to be detected, and generates an assist torque based on the target torque signal taking into consideration the correction amount. As a result, by this corrected assist torque, a change of the road reaction force is transmitted accurately to the driver via a steering wheel, and the vehicle behavior is stabilized by a steering operation in accordance with an intention of the driver.

Further, in the above vehicle behavior control apparatus, said correcting section sets a correction amount to correct said target torque signal, based on an angle difference signal from said slip angle difference predicting section and a yaw rate signal to be detected at a yaw rate detecting section.

With this vehicle behavior control apparatus, because the correcting section sets the correction amount, based on the angle difference signal and the yaw rate signal, the correction amount can be set such that both the angle difference signal and the yaw rate signal are decreased to zero. The vehicle behavior control apparatus then urges a steering operation of the driver, by the assist torque taking into consideration the correction amount, so as to decrease the steer angle. As a result, because both the angle difference signal and the yaw rate signal decrease to zero, the vehicle behavior is more stabilized.

Further, in the above vehicle behavior control apparatus, said slip angle difference predicting section calculates said angle difference signal based on a steer angle signal from said steer angle detecting section, a vehicle speed signal to be detected at a vehicle speed sensor, a yaw rate signal to be detected at the yaw rate detecting section, and dimensional parameters of the vehicle.

With this vehicle behavior control apparatus, the angle difference can be predicted by using the existing sensors mounted on the vehicle without detecting the actual angle difference. Furthermore, because parameters for calculating the angle difference are detected directly, the accuracy of the predicted angle difference becomes higher.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENT

A vehicle behavior control apparatus according to the present invention accurately detects vehicle states, based on an angle difference between a front wheel slip angle and a rear wheel slip angle, and a steer angle, and controls turning behaviors of the vehicle in correspondence with the vehicle state. Especially, an electric power steering apparatus generates an assist torque in consideration of a correction amount, which is set in accordance with the detected vehicle state, and by the corrected assist torque, a change in the road reaction force is informed accurately to the driver via a steering wheel. Because the driver is urged to carry out a steering operation in accordance with this assist torque, the vehicle behavior is stabilized by the driver's steering operation. The vehicle behavior control apparatus according to the invention may be applicable to an apparatus capable of controlling vehicle behaviors, such as an electric power steering apparatus, a four wheel steering apparatus, a left-and-right driving force distributing apparatus, and a left-and-right braking force distributing apparatus, and the like. In this preferred embodiment, the vehicle behavior control apparatus is applied to an electric power steering apparatus. Further, in this embodiment, a turn angle of the front wheels is employed as a steer angle of the vehicle, and a turn angle sensor is employed as a steer angle detecting section. Furthermore, in this embodiment, a control unit comprises a slip angle difference predicting section, and a microprocessor for the control unit processes calculations of the angle difference predicting section.

Before explaining the electric power steering apparatus according to this embodiment, vehicle states to be detected by the electric power steering apparatus will be described. Specifically, with reference to FIG. 4, vehicle states when the driver drives the vehicle will be described by utilizing an angle difference βfr between a front wheel slip angle βf and a rear wheel slip angle βr, and a turn angle δ of the front wheels.

Figure 3:
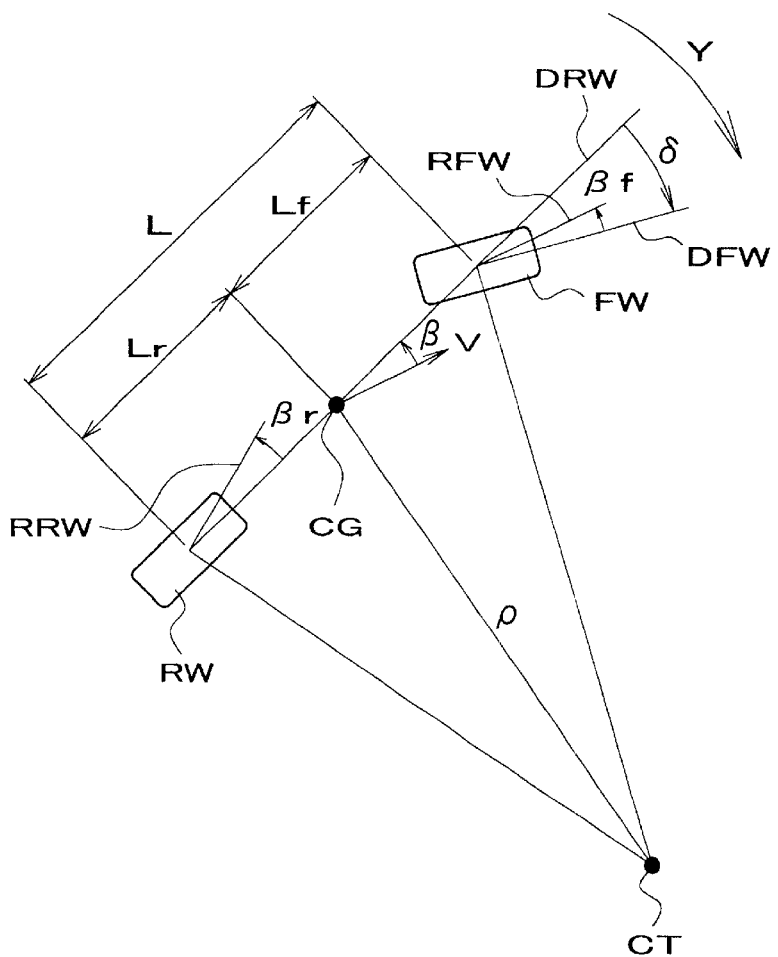
FIG. 3 shows a vehicle model (two-wheel model)

Before entering the explanation of each vehicle state shown in FIG. 4, parameters of the vehicle to be used in this embodiment will be described with reference to FIG. 3. In order to simplify the explanation, a two-wheel model as shown in FIG. 3, consisting of a front wheel FW and a rear wheel RW is employed. FIG. 3 shows a case in which the vehicle turns right by the driver's steering operation in a clockwise direction. Here, the wheel base of the vehicle is L, the distance between the axle of the front wheel FW and the center of gravity CG of the vehicle is Lf, and the distance between the axle of the rear wheel RW and the center of gravity CG of the vehicle is Lr.

The vehicle is turned around the center of turn CT by the driver's steering operation, with a turning radius ρ, a yaw rate Y, and a vehicle speed V. A turn angle δ of the front wheel indicates an angle in a direction (orientation) of the front wheel DFW with regard to a direction (orientation) of the rear wheel DRW. The turn angle δ, the yaw rate Y and the vehicle speed V are determined to be positive (plus) in the clockwise direction, and negative (minus) in the counterclockwise direction.

A front wheel slip angle βf indicates an angle in a progressing direction of the front wheel RFW with regard to the direction of the front wheel DFW, and a rear wheel slip angle βr indicates an angle in a progressing direction of the rear wheel RRW with regard to the direction of the rear wheel DRW. The angle difference between the front wheel slip angle βf and the rear wheel slip angle βr is shown by the equation βfr=βf−βr. The slip angle at the center of gravity CG is shown by β. The front wheel slip angle βf, the rear wheel slip angle βr, the angle difference βfr, and the slip angle β are determined to be positive (plus) in the clockwise direction, and negative (minus) in the counterclockwise direction. When the driver turns the steering wheel in the clockwise direction, the progressing direction of the front wheel RFW with regard to the direction of the front wheel DFW is in the counterclockwise direction, and the front wheel slip angle βf becomes positive (plus). Similarly, the rear wheel slip angle βr becomes positive (plus). The direction (sign) of the angle difference βfr is maintained to be positive (plus) until the absolute value of the rear wheel slip angle |βr| becomes greater than the absolute value of the front wheel slip angle |βf|.

The front wheel slip angle βf and the rear wheel slip angle βr are given by the following equations (1) and (2).

$$\beta f = -\beta - Lf*Y/V + \delta \quad (1)$$

$$\beta r = -\beta + Lr*Y/V \quad (2)$$

where Y: yaw rate, V: vehicle speed, δ: turn angle, Lf: distance between the axle of the front wheel FW and the center of gravity CG of the vehicle, and Lr: distance between the axle of the rear wheel RW and the center of gravity CG of the vehicle.

Further, the angle difference βfr is shown by the following equation (3) that is obtained by the equations (1) and (2).

$$\beta fr = \beta f - \beta r = -L*Y/V + \delta \quad (3)$$

If the turning radius ρ is shown by ρ=V/Y, the angle difference βfr is obtained by the following equation (4), and the turning radius ρ is given by the following equation (5).

$$\beta fr = -L/\rho + \delta \quad (4)$$

$$\rho = L/(\delta - \beta fr) \quad (5)$$

Now, each vehicle state will be described with reference to a driving diagram shown in FIG. 4.

Figure 4:
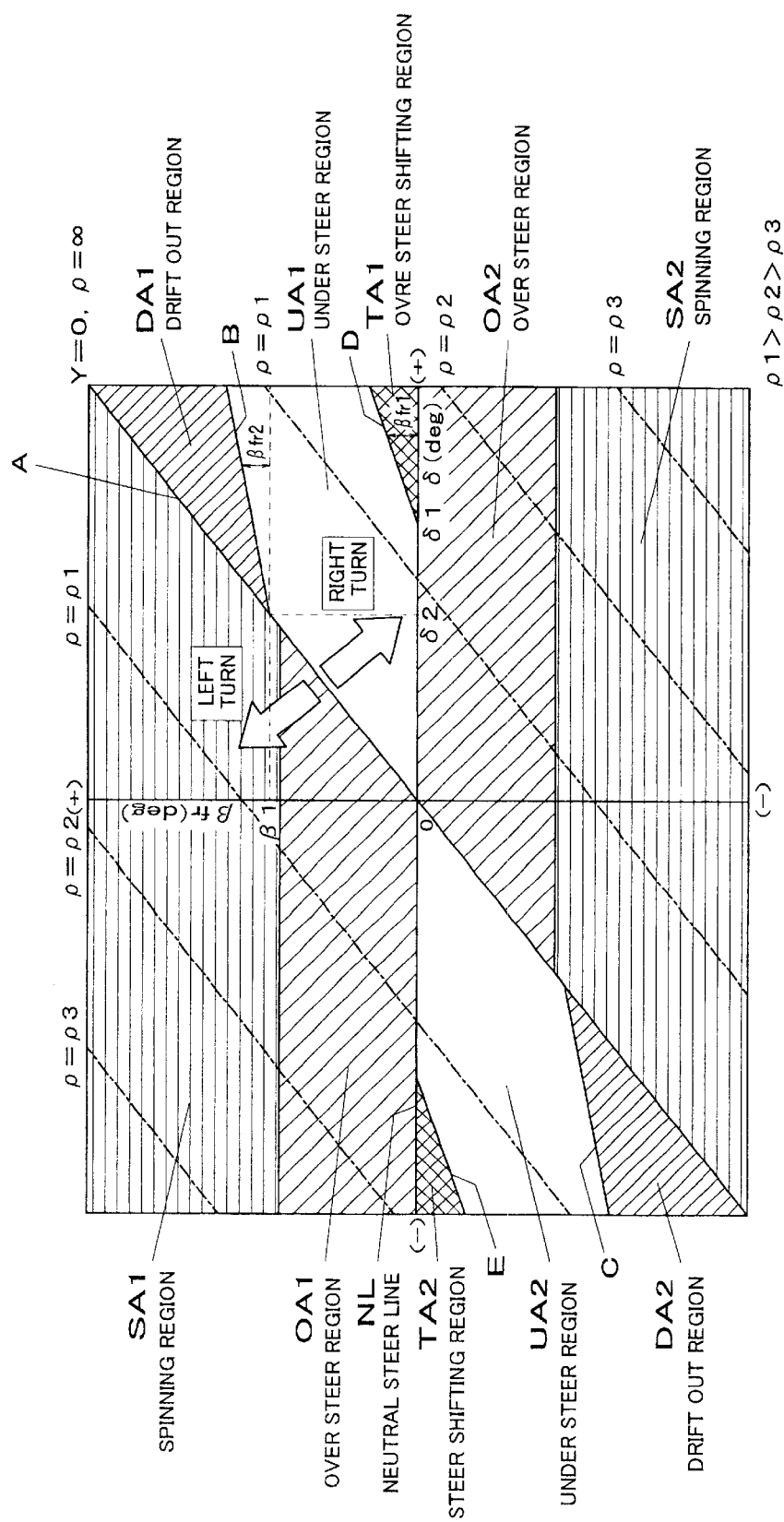
FIG. 4 is a driving diagram of the vehicle.

In FIG. 4, the horizontal axis represents turning angle δ (deg), in which the clockwise direction is determined to be positive (plus) and the counterclockwise direction is determined to be negative (minus). Meanwhile, the vertical axis represents angle difference βfr (deg), in which the counterclockwise direction is determined to be positive (plus) and the clockwise direction is determined to be negative (minus). The line NL represents the neutral steer line (i.e., the vehicle is in a neutral steer state), at which the angle difference βfr=0 (deg). When the yaw rate Y=0 (deg/s) (i.e., the vehicle is running straight), the angle difference βfr is equal to the turn angle δ from the equation (3), which is shown by the line A. The turning radius ρ is infinite, i.e. ρ=∞, in the line A. Further, considering the line A as a boundary, the vehicle turns right in the lower right region from the line A, and turns left in the upper left region from the line A. As shown in the dashed lines, the line A shifts along the axis of the angle difference βfr (vertical axis) with the turning radius ρ being a parameter of the equation (4).

When the vehicle turns right (i.e., in the lower right region from the line A), if the angle difference βfr>0, the vehicle is in an under steer region UA1 with the neutral steer line NL as the boundary. And, if the angle difference βfr<0, the vehicle is in an over steer region OA2. If the under steer state is enhanced and the absolute value of the angle difference |βfr| becomes greater, the vehicle is in a drift out region DA1. If the over steer state is enhanced and the absolute value of the angle difference |βfr| becomes greater, the vehicle is in a spinning region SA2. The vehicle tends to shift from the under steer state to the over steer state because the greater the absolute value of the turning angle |δ|, the greater the absolute value of the yaw rate |Y|. For this reason, an over steer shifting region TA1 is provided within the region where the angle difference βfr>0 and where the turn angle is over a certain value, i.e. δ1. The over steer shifting region TA1 lies between the neutral steer line NL and the boundary line D that is formed from the turn angle δ1 with the turn angle δ1 and the angle difference βfr=0 being as a base point and in such a direction that the angle difference βfr increases in proportion to the turn angle δ.

When the vehicle turns left (i.e., in the upper left region from the line A), if the angle difference βfr<0, the vehicle is in an under steer region UA2 with the neutral steer line NL as the boundary. And, if the angle difference βfr>0, the vehicle is in an over steer region OA1. If the under steer state is enhanced and the absolute value of the angle difference |βfr| becomes greater, the vehicle is in a drift out region DA2. If the over steer state is enhanced and the absolute value of the angle difference |βfr| becomes greater, the vehicle is in a spinning region SA1. Similar to the right turn, an over steer shifting region TA2 is provided within the region where the angle difference βfr<0.

In FIG. 4, the under steer regions UA1, UA2 are shown as plain pattern regions, the over steer regions OA1, OA2 as broken line regions, the drift out regions DA1, DA2 as oblique line regions, and the over steer shifting regions TA1, TA2 are shown as grid line regions.

The drift out regions DA1, DA2 are provided within a region where the absolute value of the angle difference |βfr| becomes smaller in proportion to the absolute value of the turn angle |δ| so as to enter through the under steer regions UA1, UA2. In other words, each boundary line B, C between the drift out regions DA1, DA2 and the under steer regions UA1, UA2 forms a straight line in which the absolute value of the angle difference |βfr| increases in proportion to the absolute value of the turn angle |δ|. The over steer shifting regions TA1, TA2 are provided within a region where the absolute value of the angle difference |βfr| becomes greater in proportion to the absolute value of the turn angle |δ| so as to enter through the under steer regions UA1, UA2. In other words, each boundary line D, E between the over steer shifting regions TA1, TA2 and the under steer region UA1, UA2 forms a straight line in which the absolute value of the angle difference |βfr| increases in proportion to the absolute value of the turn angle |δ|.

Figure 1:
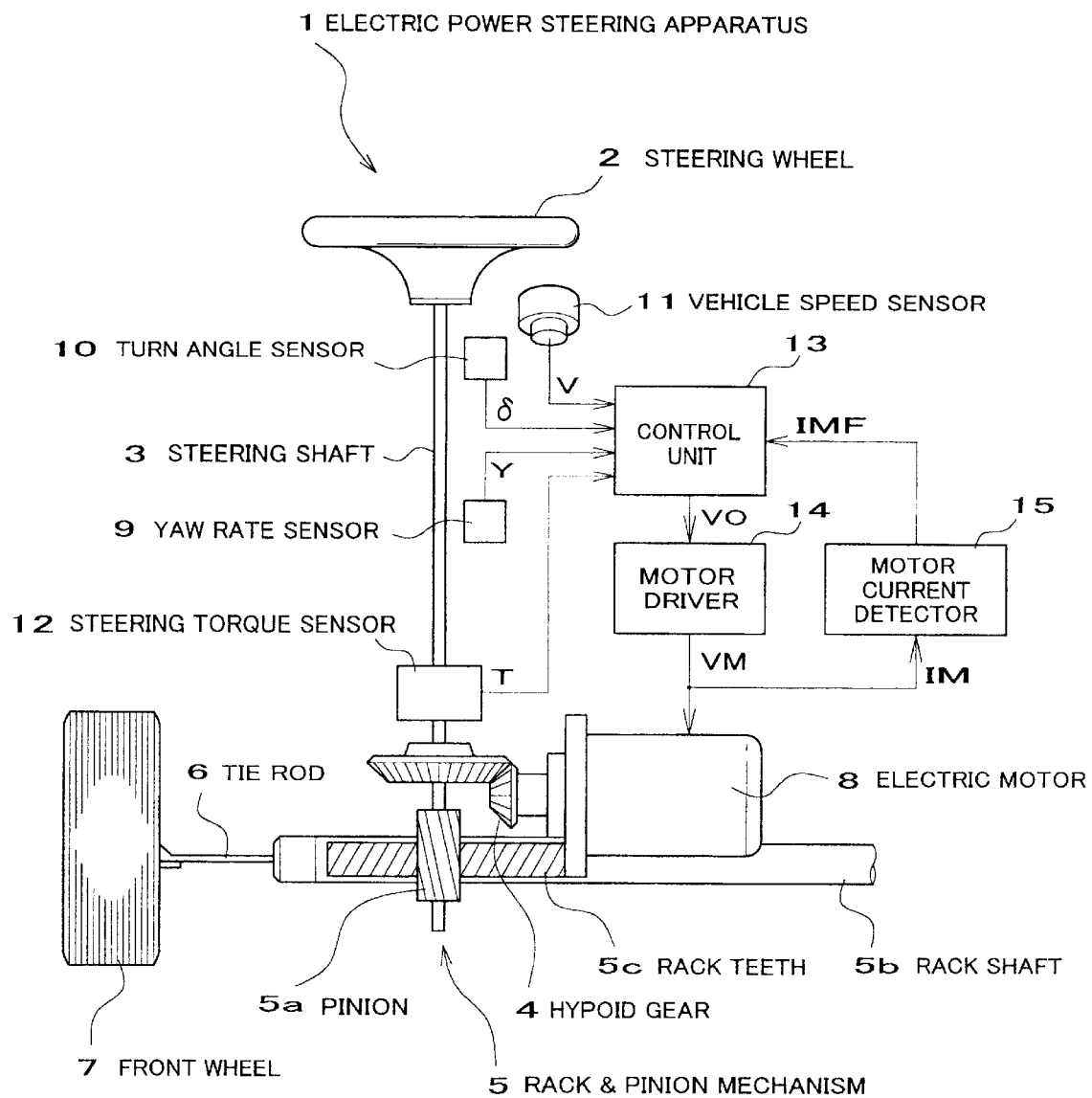
FIG. 1 is a schematic view illustrating the overall arrangement of an electric power steering apparatus according to the invention.

With reference to FIG. 1, the overall arrangement of an electric power steering apparatus 1 will be described. The electric power steering apparatus 1 comprises a steering wheel 2, a steering shaft 3, a hypoid gear 4, a rack-and-pinion mechanism 5, a tie rod 6, front steered wheels 7, an electric motor 8 for providing an assist torque to a steering system, a control unit 13, a motor driver 14 and a motor current detector 15. In order to obtain vehicle information, the electric power steering apparatus 1 further comprises, as a yaw rate detecting section, a yaw rate sensor 9, a turn angle sensor 10, a vehicle speed sensor 11, and a steering torque sensor 12.

The yaw rate sensor 9 detects a yaw rate to be produced in the vehicle, and outputs a yaw rate signal Y converted into an electric signal corresponding to the detected yaw rate. The turn angle sensor 10 detects a turn angle of the front wheel 7, and outputs a turn angle signal δ converted into an electric signal corresponding to the detected turn angle. The vehicle speed sensor 11 detects a vehicle speed, and outputs a vehicle speed signal V converted into an electric signal corresponding to the detected vehicle speed. The steering torque sensor 12 detects a steering torque to be produced by the steering wheel 2, and outputs a steering torque signal T converted into an electric signal corresponding to the detected steering torque. The turn angle signal δ may be calculated from a steering angle of the steering shaft 3. Also, the yaw rate signal Y may be calculated from the turn angle signal δ and the vehicle speed signal V. These sensors are not limited to construction for outputting the respective signals to the electric power steering apparatus 1. The sensors may output the signals to other apparatus mounted on the vehicle. Alternatively, the existing sensors mounted on the other apparatus may be used instead of these sensors.

Each of the yaw rate signal Y, the turn angle signal δ, the vehicle speed signal V, and the steering torque signal T has a magnitude and a direction, and is supplied to the control unit 13. In respect of the directions of the yaw rate signal Y, the turn angle δ, the vehicle speed signal V, and the steering torque signal T, the clockwise direction is determined to be positive (plus), while the counterclockwise direction is determined to be negative (minus).

When the driver operates the steering wheel 2, a manual steering torque produced in the steering shaft 3 is converted into a thrust force in the axial direction of a rack shaft 5b via the rack-and-pinion mechanism 5. In such a construction of the rack-and-pinion mechanism 5 that rack teeth 5c meshing with the pinion 5a are formed on the rack shaft 5b, a rotational force of the pinion 5a is converted into a reciprocating movement along the rack shaft 5b by the meshing engagement between the pinion 5a and the rack teeth 5c. The electric power steering apparatus 1 then changes this axial thrust force in the rack shaft 5b into an operational direction of the front wheels 7 via the tie rod 6.

The electric power steering apparatus 1 drives the electric motor 8 in accordance with the steering torque signal T, for the assistance of the manual steering torque. The torque generated at the electric motor 8 is converted into an assist torque magnified via the hypoid gear 4, and the magnified assist torque is applied to the steering shaft 3. As a result, the manual steering torque of the driver to be applied to the steering shaft 3 is reduced.

Figure 2:
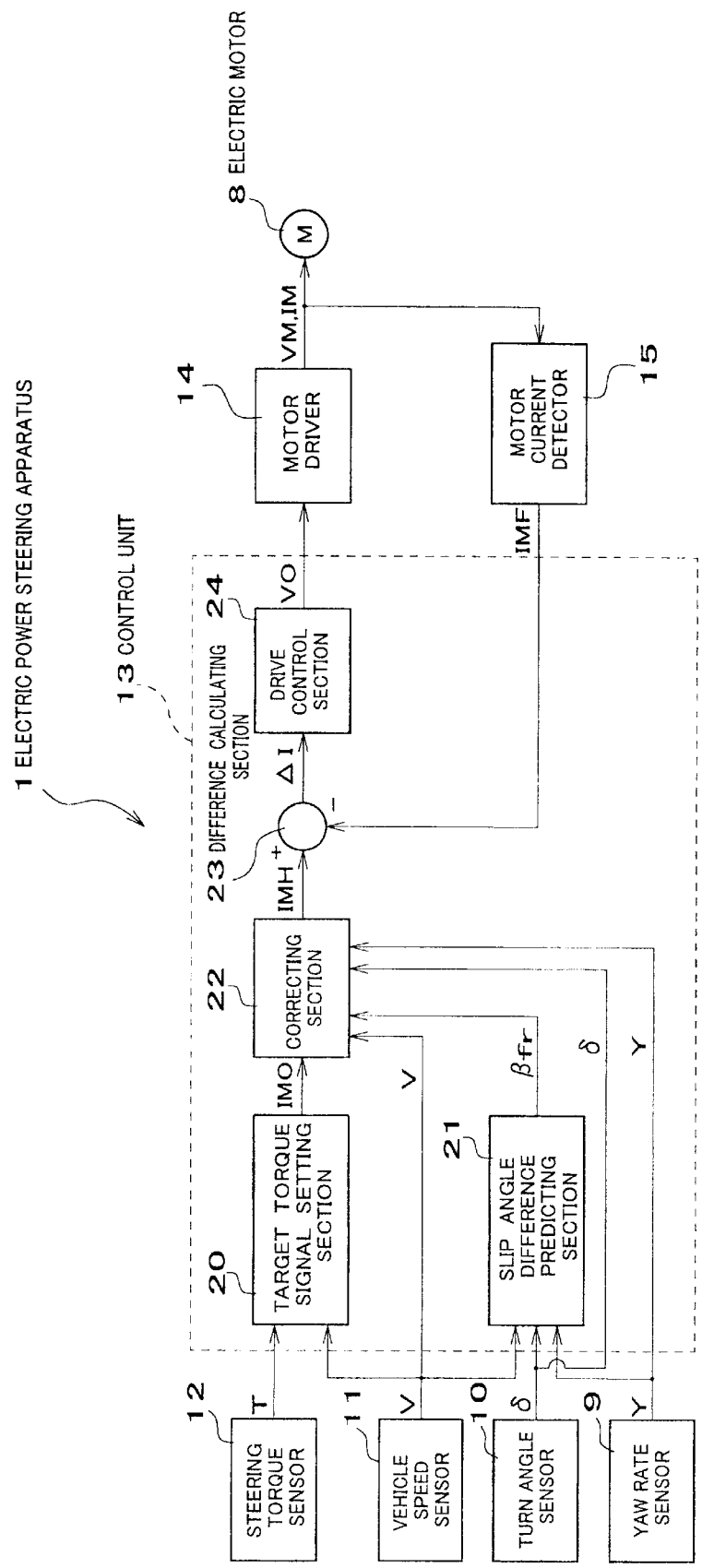
FIG. 2 is a block diagram showing a part of the electric power steering apparatus of FIG. 1.

The control unit is comprised basically of a microprocessor and includes various operating units, processing units, determining sections, switching sections, signal generating section, memories and so forth. The control unit 13 generates a target torque signal IMO corresponding to the steering torque signal T. Further, the control unit 13 outputs a motor control signal VO, which corresponds to a difference (negative feedback) between the target torque signal IMO and a motor torque signal IMF inputted from the motor current detector 15, to the motor driver 14 (FIG. 2). The control unit 13 controls the motor driver 14 by the motor control signal VO such that the difference (between the target torque signal IMO and a motor torque signal IMF) is swiftly nullified to be become 0.

As shown in FIG. 2, The control unit 13 further comprises a slip angle difference predicting section 21 and a correcting section 22 so as to correct the target torque signal IMO with a correction amount corresponding to each vehicle state (vehicle behavior). The slip angle difference predicting section 21 calculates and predicts an angle difference βfr from the equation (3), based on the yaw rate signal Y, the turn angle signal δ, the vehicle speed signal V, and the vehicle dimensional parameter (wheel base L), and outputs the angle difference signal βfr to the correcting section 22. The correcting section 22 determines, based on the angle difference signal βfr and the turn angle signal δ, whether the vehicle is in the under steer state, the drift out state, the over steer state, or the over steer shifting state, and then corrects the target torque signal IMO by the correction amount to be set in accordance with the respective vehicle states. The correcting section 22 determines, based on the angle difference signal βfr, an angle difference change amount signal Dv, the yaw rate signal Y, and the steering torque signal T, whether the vehicle is in the under steer state, the drift out state, the over steer state, the over steer shifting state, or an excessive counter steer state, and then corrects the target torque signal IMO by the correction amount to be set in accordance with the respective vehicle states.

The motor driver 14 comprises a bridge circuit comprising switching elements of, for example, four power FETs (field effect transistors), insulated gate bipolar transistors (IGBT) and so forth. The motor driver 14 applies a PWM (pulse width modulated) motor voltage VM to the electric motor 8 based on the motor control signal VO, so as to PWM-drive the electric motor 8 in either regular or reverse rotational direction. A motor current IM flows into the electric motor 8 so that the electric motor 8 generates a torque in proportion to the motor current IM.

The motor current detector 15 comprises a resistor, a hole element or the like to be connected in series with the electric motor 8, and detects the motor current IM that actually flows into the electric motor 8 by converting it into a voltage. The motor current detector 15 then feeds a motor torque signal IMF corresponding to the detected motor current IM back to the control unit 13 (negative feedback).

With reference to FIG. 2, the control unit 13 of the electric power steering apparatus 1 will be described. The control unit 13 comprises a target torque signal setting section 20, a slip angle difference predicting section 21, a correcting section 22, a difference calculating section 23, and a drive control section 24.

The target torque signal setting section 21 has a memory such as a ROM (Read Only Memory), and stores data in correspondence with the steering torque signal data T and the target torque signal data IMO which have been set in advance based on experimental values or design values with the vehicle speed V as a parameter. The steering torque signal T from the steering torque sensor 12 and the vehicle speed signal V from the vehicle speed sensor 11 are input to the target torque signal setting section 20. The target torque signal setting section 20 reads the corresponding target torque signal data IMO based on the steering torque signal T and the vehicle speed signal V, and supplies the target torque signal IMO to the correcting section 22. The target torque signal IMO changes in proportion to the vehicle speed V such that when the vehicle speed is low, i.e., the road reaction force is great, it takes a large value, while when the vehicle speed is high to keep the vehicle stable during running, it takes a small value. The target torque signal IMO also changes in proportion to the steering torque signal T such that when the steering torque signal T is in the vicinity of 0, it takes 0, and when the steering torque signal T increases over a certain value, it increases in accordance with the increasing steering torque signal T. Because the maximum current to be flown into the electric motor 8 is provided, the target torque signal IMO is set under the maximum target torque signal.

The slip angle difference predicting section 21 has a memory such as a ROM, and an operating unit. The yaw rate signal Y from the yaw rate sensor 9, the turn angle signal δ from the turn angle sensor 10, and the vehicle speed signal V from the vehicle speed sensor 11 are input to the slip angle difference predicting section 21, and the slip angle difference predicting section 21 outputs the angle difference signal βfr to the correcting section 22. The slip angle difference predicting section 21 calculates and predicts an angle difference βfr between the front wheel slip angle βf and the rear wheel slip angle βr as a vehicle behavior, from the equation (3), based on the yaw rate signal Y, the turn angle signal δ, the vehicle speed signal V, and vehicle dimensional parameters (wheel base L in this preferred embodiment) stored in the memory. For this reason, the slip angle difference predicting section 21 is not required to detect the angle difference βfr directly. An accurate prediction of the angle difference βfr can be made by the use of existing sensors. Further, because the slip angle difference predicting section 21 calculates the angle difference βfr from the equation (3), there is no need for provision of a differential-processing circuit as an operating unit, thereby preventing noise mixture. The angle difference signal βfr has a magnitude and a direction, which are determined to be positive (plus) in the clockwise direction and negative (minus) in the counterclockwise direction.

Figure 7:
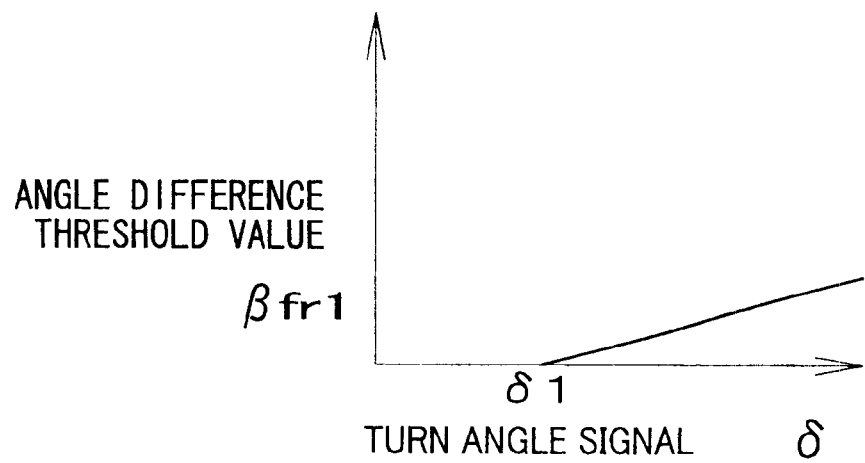
FIG. 7 is a graph illustrating characteristics of a turn angle signal δ—an angle difference threshold value βfr1.
Figure 8:
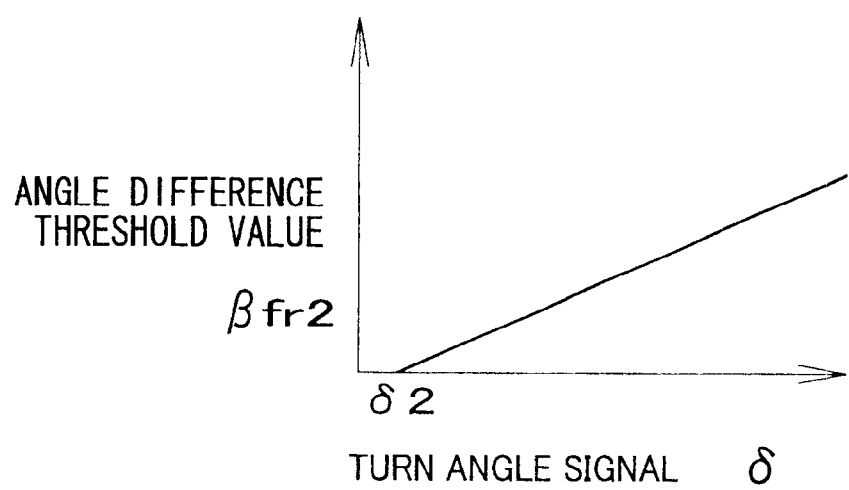
FIG. 8 is a graph illustrating characteristics of the turn angle signal δ—an angle difference threshold value βfr2.
Figure 9:
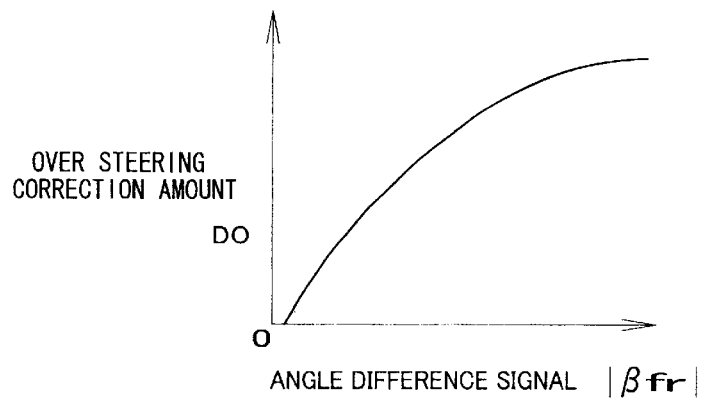
FIG. 9 is a graph illustrating characteristics of an angle difference signal absolute value |β|—an over steering correction amount DO.
Figure 10:
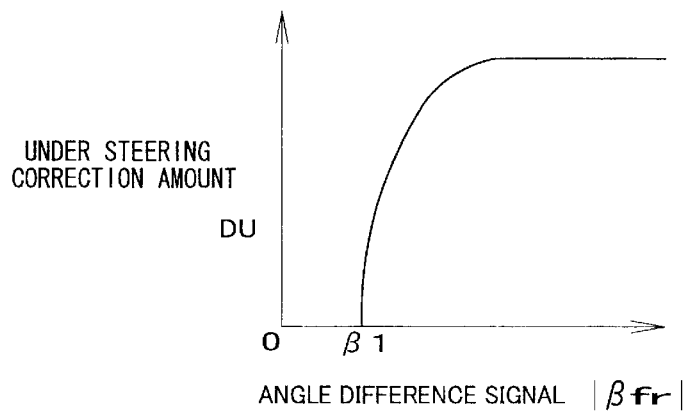
FIG. 10 is a graph illustrating characteristics of the angle difference signal absolute value |β|—an under steering correction amount DU.
Figure 11:
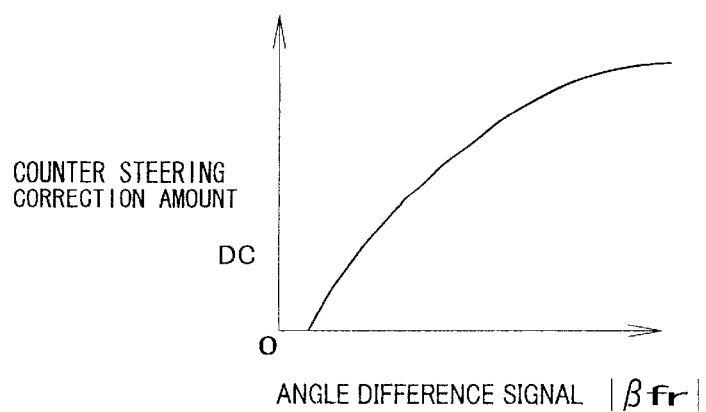
FIG. 11 is a graph illustrating characteristics of the angle difference signal absolute value |β|—a counter steering correction amount DC.

The correcting section 22 has a memory such as a ROM, and software-controlled comparison, switching, and calculation functions. The correcting section 22 stores angle difference threshold values βfr1 and βfr2 corresponding to the turn angle δ, and a correction amount corresponding to the angle difference βfr (over steering correction amount DO, under steering correction amount DU, and counter steering correction amount DC) in the ROM. The correcting section 22 further generates a corresponding correction amount based on the angle difference signal βfr from the slip angle difference predicting section 21 and the turn angle signal δ from the turn angle sensor 10, and provides the difference calculating section 23 with a target torque signal IMH produced by correcting the target torque signal IMO by the correction amount. The angle difference threshold values βfr1, βfr2 are previously set in accordance with the turn angle δ and based on experimental values or design values, and they have a corresponding relation to the turn angle signal δ, as shown in FIGS. 7 and 8. The over steering correction amount DO, the under steering correction amount DU, and the counter steering correction amount DC are previously set in accordance with the angle difference βfr and based on experimental values or design values, and they have a corresponding relation to the angle difference signal absolute value |βfr|, as shown in FIGS. 9 to 11.

The correcting section 22 determines that the vehicle is in a normal running state at which the vehicle behavior is stable, when the vehicle behavior falls in the under steer region UA1, UA2. In this instance, the correction amount is 0 and the correcting section 22 outputs the target torque signal as IMH=IMO.

When the vehicle behavior falls in a region other than the under steer region UA1, UA2, the correcting section 22 determines that the vehicle behavior is unstable. In this instance, the correcting section 22 selects a correction amount in accordance with the angle difference βfr, and corrects the target torque signal IMO. In order to urge a steering operation to a direction where the turn angle δ decreases, the correcting section 22 outputs the target torque signal as IMH<IMO by subtracting the correction amount from the target torque signal IMO, or outputs the target torque signal as IMH>IMO by adding the correction amount to the target torque signal IMO.

In order to achieve a more stable state of the vehicle behavior, an assist is ideally made by an assist torque in such a way that the turn angle δ is steering-operated to a direction where the angle difference of βfr and the yaw rate Y become zero. The correcting section 22 then sets the correction amount based on the angle difference βfr and the yaw rate Y. Firstly, the turn angle δ is obtained by the following equation (6), which is transformed from the equation (3). Further, in order to decrease the angle difference βfr and the yaw rate Y to the direction of zero, an ideal correction amount VC is determined by the following equation (7) that is obtained from the equation (6).

$$\delta = \beta fr + L*Y/V \quad (6)$$

$$VC = G1*\beta fr + G2*Y \quad (7)$$

Where G1, G2: coefficients.

Figure 12:
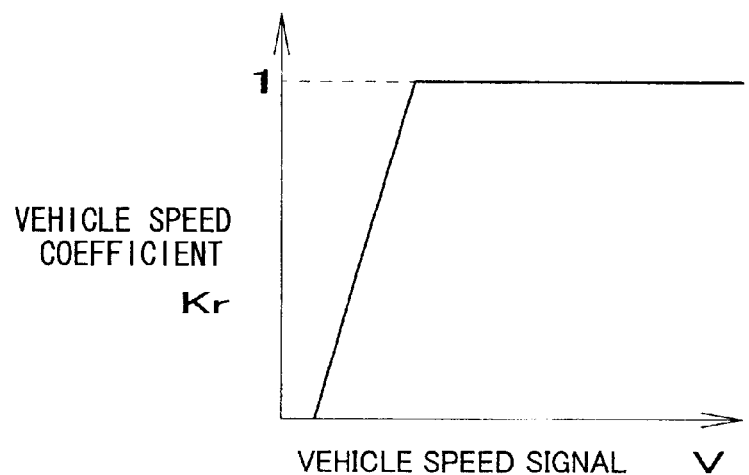
FIG. 12 is a graph illustrating characteristics of a vehicle speed signal V—a vehicle speed coefficient Kr.
Figure 13:
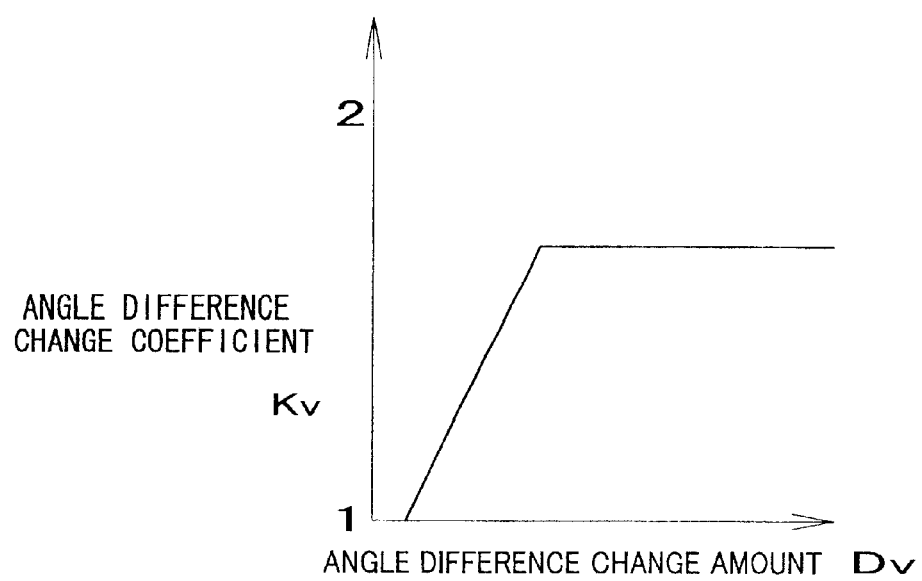
FIG. 13 is a graph illustrating characteristics of an angle difference change amount Dv—an angle difference change coefficient Kv.

As shown in the equation (7), the correcting section 22 sets the correction amount VC based on the angle difference βfr and the yaw rate Y (specifically, by a function with the angle difference βfr and the yaw rate Y as a parameter). To this end, the correcting section 22 stores a vehicle speed coefficient Kr, an angle difference change coefficient Kv, and a yaw rate coefficient G2 in the ROM. The correcting section 22 then sets the correction amount VC by multiplying the correction amount that is generated based on the angle difference βfr and the turn angle δ by the vehicle speed coefficient Kr and the angle difference change coefficient Kv, as well as by multiplying the yaw rate Y by the yaw rate coefficient G2. Further, the correcting section 22 outputs the target torque signal IMH that is obtained by correcting the target torque signal IMO by the correction amount VC to the difference calculating section 23. The vehicle speed coefficient Kr is previously set in correspondence with the vehicle speed V based on experimental values or design values, and as shown in FIG. 12, it has a corresponding relation with the vehicle speed signal V. The angle difference change coefficient Kv is previously set in correspondence with a change amount of the angle difference βfr based on experimental values or design values, and as shown in FIG. 13, it has a corresponding relation with the angle difference change amount DV. Similarly, the yaw rate coefficient G2 is previously set in correspondence with the yaw rate Y based on experimental value or design values.

The difference calculating section 23 is provided with a subtracter or a subtracting function. The difference calculating section 23 calculates a difference ΔI (=IMH−IMF) between the target torque signal IMH from the correcting section 22 and the motor torque signal IMF from the motor current detector 15, and outputs the difference signal ΔI to the drive control section 24.

The drive control section 24 has a PID (Proportional plus Integral plus Derivative) controller, a motor control signal generating section, and the like. The drive control section 24 subjects the difference signal ΔI from the difference calculating section 23 to a proportional (P), integral (I) and derivative (D) control. Further, the drive control section 24 generates a PMW motor control signal VO corresponding to rightward or leftward turning of the steering wheel 2 based on a mixture signal mixed with the signals subjected to the PID control, and outputs the motor control signal VO to the motor driver 14.

As mentioned above, the control unit 13 is provided with the slip angle difference predicting section 21 for predicting the angle difference βfr between the front wheel slip angle βf and the rear wheel slip angle βr, and the correcting section 22 for correcting the target torque signal IMO based on the angle difference signal βfr from the slip angle difference predicting section 21 and the turn angle signal δ from the turn angle sensor 10. Therefore, the control unit 13 can predict the behavior of the vehicle from the angle difference signal βfr as well as predict the input of the driver to the vehicle from the turn angle signal δ, which enables an accurate detection of the vehicle state. The control unit 13 can control the drive of the electric motor 8 so as to generate an assist torque corresponding to each state of the vehicle, thereby informing the driver of a change of the vehicle behavior as a change of the road reaction force.

The operation of the correcting section 22 will be described with reference to a flow chart. In this preferred embodiment, two modes will be exemplified as the operation of the correcting section 22.

Figure 5:
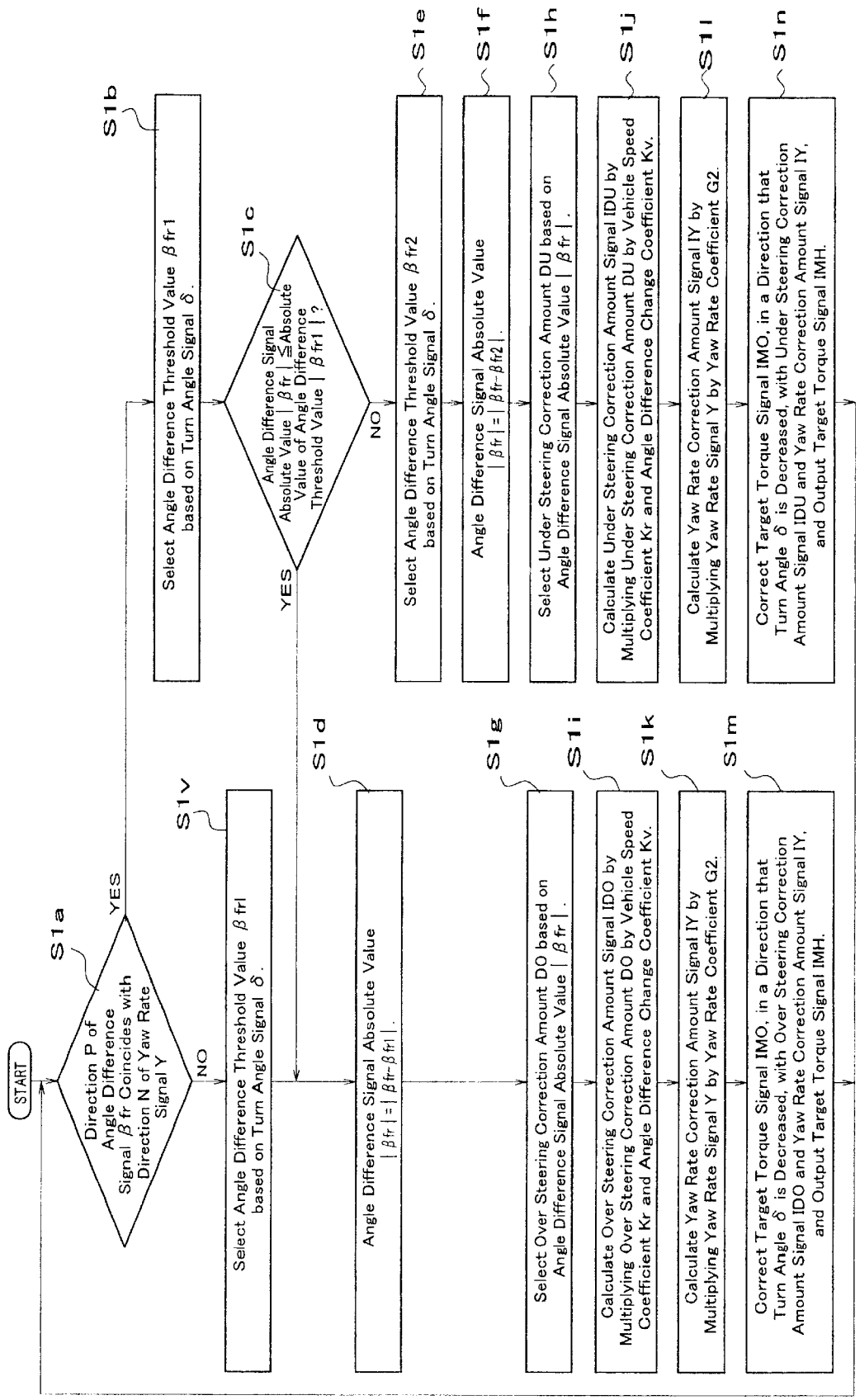
FIG. 5 is a flow chart showing operation of a correcting section of the electric power steering apparatus shown in FIG. 1, in which is exemplified a first embodiment.

With reference to a flow chart shown in FIG. 5, the first mode of operation of the correcting section 22 will be described.

The correcting section 22 compares a direction P of the angle difference signal βfr from the slip angle difference predicting section 21 with a direction N of the yaw rate signal Y from the yaw rate sensor 9 (S1a). For example, if the yaw rate Y is in the clockwise direction (right turn direction) and the rear wheel slip angle βr in the counterclockwise direction is greater than the front wheel slip angle βf in the counterclockwise direction (i.e. the vehicle behavior is in the over steer state), the direction N of the yaw rate signal Y is positive (plus) and the direction P of the angle difference signal βfr is negative (minus). If the yaw rate Y is in the clockwise direction (right turn direction) and the front wheel slip angle βf in the counterclockwise direction is greater than the rear wheel slip angle βr in the counterclockwise direction (i.e. the vehicle behavior is in the under steer state), the direction N of the yaw rate signal Y is positive (plus) and the direction P of the angle difference signal βfr is positive (plus).

When the direction P of the angle difference signal βfr and the direction N of the yaw rate signal Y do not coincide with each other, the correcting section 22 determines that the vehicle state is in the over steer state (or the spinning state), i.e. the vehicle state is either in the over steer region OA1, OA2, or in the spinning region SA1, SA2 shown in the driving diagram of FIG. 4, and the operation proceeds to step S1v.

At step S1v, the correcting section 22 selects an angle difference threshold value βfr1 (S1v) from the characteristics data of a turn angle signal δ—an angle difference threshold value βfr1 (FIG. 7), based on the turn angle signal δ from the turn angle sensor 10, and the operation proceeds to step S1d.

Meanwhile, when the direction P of the angle difference signal βfr and the direction N of the yaw rate signal Y coincide with each other, similar to step S1v, the correcting section 22 selects an angle difference threshold value βfr1 (S1b) from the characteristics data of a turn angle signal δ—an angle difference threshold value βfr1 (FIG. 7), based on the turn angle signal δ from the turn angle sensor 10. In this instance, the vehicle behavior is either in the under steer region UA1, UA2, the drift out region DA1, DA2, or the over steer shifting region TA1, TA2 as shown in the driving diagram of FIG. 4. The angle difference threshold value βfr1 is for determining whether the vehicle behavior is in the over steer shifting region TA1, TA2 shown in FIG. 4. To this end, the characteristics of a turn angle signal δ—an angle difference threshold value βfr1 shown in FIG. 7 is set in accordance with the boundary lines D, E of the driving diagram shown in FIG. 4. In other words, the angle difference threshold value βfr1 increases from 1 in proportion to the turn angle signal δ.

The correcting section 22 then compares the absolute value of the angle difference signal |βfr| with the absolute value of the angle difference threshold value |βfr1| (S1c). If the absolute value of the angle difference threshold value |βfr1| is equal to or greater than the absolute value of the angle difference signal |βfr|, the correcting section 22 determines that the vehicle state is in the over steer shifting state, i.e. the over steer shifting region TA1, TA2 in the driving diagram shown in FIG. 4, and the operation proceeds to step S1d. This is to swiftly correct the target torque signal IMO by the over steering correction amount DO, in order to prevent the over steer state at any rate, because the vehicle behavior is about to be shifted from the under steer state to the over steer state. However, because the vehicle behavior does not actually fall in the over steer state yet, there is a need to make it difficult to carry out the correction by the over steering correction amount DO. For this reason, the correction section 22 calculates the absolute value of the angle difference signal |βfr| from the angle difference signal βfr and the angle difference threshold value βfr1 by the equation |βfr|=|βfr−βfr1| (S1d). Because the over steering correction amount DO is selected with the absolute value of the angle difference signal being |βfr|=|βfr−βfr1|, the over steering correction amount DO can be determined by strictly judging the boundary lines D, E of the over steer shifting region TA1, TA2 and the under steer region UA1, UA2 based on the angle difference signal βfr and the turn angle signal δ. Specifically, the greater the absolute value of the turn angle |δ|, the more the over steer shifting regions TA1 ,TA2 extend in a region where the absolute value of the angle difference signal |βfr| is greater, and the correction by the over steering correction amount DO can be made.

In the aforementioned description, the reason for carrying out the step S1d is to make the over steering correction amount DO larger in the case of entering the over steer region OA1, OA2 via the over steer shifting region TA1, TA2. Because the sign of the angle difference threshold value βfr1 is different from that of the angle difference signal βfr, the absolute value of the angle difference signal |βfr|= |βfr−βfr1| becomes larger than the original |βfr| value. As apparent from FIG. 9, the over steering correction amount DO can be increased.

Further, the reason for carrying out the steps S1v, S1d irrespective of the judgement result at the step S1a being NO is to continuously change the over steering correction amount DO in the case of entering the over steer region OA1, OA2 via the over steer shifting region TA1, TA2. As a control flow, when in the over steer shifting region TA1, TA2, the operation proceeds in the order of step S1a, step S1b, step S1c, step S1d, and step S1g, and when entering the over steer region OA1, OA2, the operation proceeds in the order of step S1a, step S1v, step S1d, and step S1g. Therefore, the step S1d is carried out both in the over steer shifting region TA1, TA2 and the over steer region OA1, OA2 so as to continuously change the over steering correction amount DO. As apparent from FIG. 7, when entering the over steer region OA1, OA2 directly from the under steer region UA1, UA2, no problem will arise because the angle difference threshold value βfr1=0.

Meanwhile, when the absolute value of the angle difference threshold value |βfr1| is less than the absolute value of the angle difference signal |βfr|, the correcting section 22 selects an angle difference threshold value βfr2 (S1e) from the characteristics data of a turn angle signal δ—an angle difference threshold value βfr2 (FIG. 8), based on the turn angle signal δ, so as to determine whether the vehicle behavior is either in the under steer region UA1, UA2 or in the drift out region DA1, DA2 in the driving diagram shown in FIG. 4. The angle difference threshold value βfr2 is for determining whether or not the vehicle behavior is in the drift out region DA1, DA2 of FIG. 4. For this reason, the characteristics of a turn angle signal δ—an angle difference threshold value βfr2 shown in FIG. 8 are set in correspondence with the boundary lines B, C in the driving diagram of FIG. 4. The angle difference threshold value βfr2 increases from the point at which the turn angle δ is β2, in proportion to increment of the turn angle signal δ.

The correcting section 22 then calculates the absolute value of the angle difference signal |βfr| from the angle difference signal βfr and the angle difference threshold value βfr2 by the equation |βfr|=|βfr−βfr2| (S1f). There is no need to correct the road reaction force because when |βfr−βfr2| is equal to or less than |β1| (i.e. the vehicle state is in the under steer region UA1, UA2 of FIG. 4), the vehicle state is in the weak under steer state. As shown in FIG. 10, when |βfr−βfr2| is equal to or less than |β1|, the under steering correction amount DU corresponding to the absolute value of the angle difference signal |βfr|=|βfr−βfr2| becomes 0. When the absolute value of the angle difference signal |βfr| is less than |β1| (FIG. 4, and FIG. 10), a correction is not required because of a dead zone region of the under steering correction amount DU in respect of the angle difference signal βfr (the vehicle behavior is stable because in the weak under steer state). Because the dead zone region is set to be larger, when entering a region where a correction is required (|βfr|>|β1|) out from the dead zone region, the under steering correction amount DU is set to increase abruptly (FIG. 10). Meanwhile, when |βfr−βfr2| is greater than |β1| (i.e. the vehicle state is in the drift out region DA1, DA2 of FIG. 4), a correction is required because the vehicle state is in the drift out state. Because the under steering correction amount DU is selected with the absolute value of the angle difference signal being |βfr|=|βfr−βfr2|, the under steering correction amount DU can be determined by strictly judging the boundary lines B, C of the drift out region DA1, DA2 and the under steer region UA1, UA2 based on the angle difference signal βfr and the turn angle signal δ. Specifically, the smaller the absolute value of the turn angle |δ|, the more the drift out regions DA1, DA2 extend in a region where the absolute value of the angle difference signal |βfr| is smaller. The absolute value of the angle difference signal |βfr|=|βfr−βfr2| becomes smaller because the sign of the angle difference threshold value βfr2 coincides with that of the angle difference signal βfr. Because the absolute value of the angle difference signal |βfr|=|βfr−βfr2| becomes greater in a smaller region where the absolute value of the turn angle |δ| is smaller, there is a tendency to carry out a correction in the drift out state, and thereby the under steering correction amount DU becomes greater.

After judging each condition of the vehicle, the correcting section 22 then selects a correction amount in accordance with each vehicle state. If the over steer state is determined at the step S1a or the over steer shifting state is determined at the step S1c, the correcting section 22 selects an over steering correction amount DO (S1g) from the characteristics of the absolute value of an angle difference signal |βfr|—an over steering correction amount DO shown in FIG. 9, based on the absolute value of the angle difference signal |βfr|. Because the over steer state is not stable as vehicle behavior, a control is made so as not to enter the over steer state. For this reason, in comparison with the dead zone region of the under steering correction amount DU (a region where the under steering correction amount DU=0) in respect to the angle difference signal βfr, the dead zone region of the over steering correction amount DO (a region where the over steering correction amount DO=0) in respect to the angle difference signal βfr is set as an extremely narrow region (FIGS. 9 and 10).

Further, when the absolute value of the angle difference signal |βfr| is set at the step S1f, the correcting section 22 selects an under steering correction amount DU (S1h) from the characteristics of the absolute value of an angle difference signal |βfr|—an under steering correction amount DU shown in FIG. 10, based on the absolute value of the angle difference signal |βfr|. When |βfr−βfr2| is equal to or less than |β1|, the under steering correction amount DU is 0, and when |βfr−βfr2| is greater than |β1| (drift out state), the under steering correction amount DU is set in accordance with the angle difference signal |βfr|.

After the over steering correction amount DO or the under steering correction amount DU has been selected, a change of the vehicle speed V and a change of the angle difference βfr are taken into consideration for the selected correction amount. The correcting section 22 then multiplies the over steering correction amount DO by a vehicle speed coefficient Kr and an angle difference change coefficient Kv, and thereby generates an over steering correction amount signal IDO (S1i). Otherwise, the correcting section 22 multiplies the under steering correction amount DU by the vehicle speed coefficient Kr and the angle difference change coefficient Kv, and thereby generates an under steering correction amount signal IDU (S1j). As mentioned above, because the correction amount is multiplied by the vehicle speed coefficient Kr, a change of the vehicle behavior due to a change of the vehicle speed V can be strictly taken into consideration for the correction amount. Moreover, because the correction amount is multiplied by the angle difference change coefficient Kv, a change of the vehicle behavior due to a change of the angle difference βfr can be strictly taken into consideration for the correction amount. As a result, an abrupt change of the road reaction force can be informed to the driver via the steering wheel 2.

The correcting section 22 selects a vehicle speed coefficient Kr from the characteristics data of a vehicle speed signal V—a vehicle speed coefficient Kr shown in FIG. 12, based on the vehicle speed signal V. The correcting section 22 also selects an angle difference change coefficient Kv from the characteristics data of an angle difference change amount Dv—an angle difference change coefficient Kv shown in FIG. 13, based on the angle difference change amount Dv. The angle difference change amount Dv is calculated by differentiating the angle difference signal βfr by time. Therefore, the correcting section 22 has a differential calculation function and the like, and generates an angle difference change amount Dv (=dβfr/dt) by time-differentiating the angle difference signal βfr provided from the slip angle difference predicting section 21.

Further, the correcting section 22 multiplies the yaw rate signal Y from the yaw rate sensor 9 by a yaw rate coefficient G2, and thereby generates a yaw rate correction amount signal IY (S1k, S11). As mentioned above, because the yaw rate correction amount signal IY is taken into consideration as a correction amount in respect to the target torque signal IMO, the vehicle behavior becomes more stable.

Finally, when the over steering correction amount signal IDO and the yaw rate correction amount signal IY are set, the correcting section 22 corrects the target torque signal IMO by the over steering correction amount signal IDO and the yaw rate correction amount signal IY in a direction where the turn angle δ is decreased, and outputs the target torque signal IMH to the difference calculating section 23 (S1m). And, when the under steering correction amount signal IDU and the yaw rate correction amount signal IY are set, the correcting section 22 corrects the target torque signal IMO by the under steering correction amount signal IDU and the yaw rate correction amount signal IY in a direction where the turn angle δ is decreased, and outputs the target torque signal IMH to the difference calculating section 23 (S1n).

Here, the term the "direction where the turn angle δ (steer angle) is decreased" indicates that an assist torque for urging a steering operation is generated in a direction where the turn angle δ is decreased, and the angle difference βfr and the yaw rate Y are decreased in the direction of zero, thereby stabilizing the vehicle behave or. One example will be shown below for a correction in the direction where the turn angle δ is decreased. For example, when the driver turns the steering wheel 2 in a clockwise direction (right turn), the turn angle δ is also in the clockwise direction (positive) and an assist torque is also generated in the clockwise direction (positive). Therefore, in order to decrease the turn angle δ, the assist torque in the clockwise direction has to be decreased so as to urge the driver to initiate a steering operation in the counterclockwise direction. For this reason, the target torque signal IMH has to be decreased, and thus the following equation is applied, i.e. Target torque signal IMH=Target torque signal IMO−((Over steering correction amount signal IDO or Under steering correction amount signal IDU)+Yaw rate correction amount signal IY). However, when the driver turns the steering wheel 2 from the clockwise direction (right turn) to the counterclockwise direction (left turn), an assist torque maybe generated in the counterclockwise direction (negative) while the turn angle δ remains in the clockwise direction (positive). In order to decrease the turn angle δ, the assist torque in the counterclockwise direction has to be increased so as to urge the driver to initiate a steering operation in the counterclockwise direction. Therefore, the target torque signal IMH has to be increased, and thus the following equation is applied, i.e. Target torque signal IMH=Target torque signal IMO+((Over steering correction amount signal IDO or Under steering correction amount signal IDU)+Yaw rate correction amount signal IY).

According to the electric power steering apparatus 1 provided with the aforementioned correcting section 22, because the vehicle behavior can be determined based on the angle difference signal βfr and the turn angle signal δ, an accurate judgement can be made on the over steer shifting state and the drift out state. Therefore, the electric power steering apparatus 1 can accurately inform the driver of the road reaction force in accordance with each vehicle state, urging the optimum steering operation in respect to the vehicle behavior.

Figure 6:
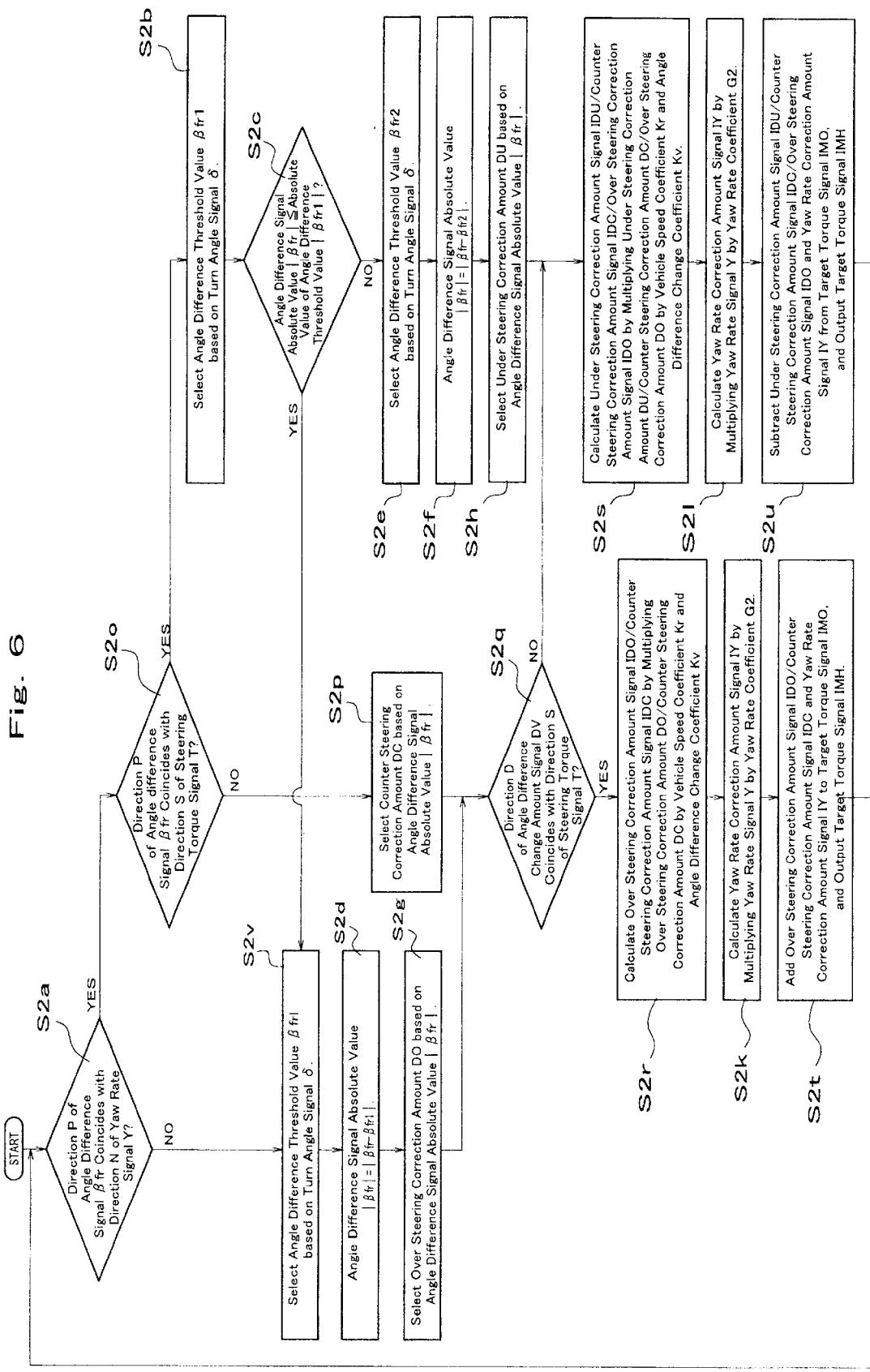
FIG. 6 is a flow chart showing operation of the correcting section of the electric power steering apparatus, in which is exemplified a second embodiment.

With reference to a flow chart shown in FIG. 6, the second mode of operation of the correcting section 22 will be described.

Because this second mode of operation includes similar operations to those of the first mode of operation, those similar operations will be indicated by the same alphabet placed after each step number in the flowchart, and detailed description thereof will be omitted.

The correcting section 22 compares a direction P of the angle difference signal βfr from the slip angle difference predicting section 21 with a direction N of the yaw rate signal Y from the yaw rate sensor 9 (S2a). When the direction P of the angle difference signal βfr and the direction N of the yaw rate signal Y do not coincide with each other, the correcting section 22 determines that the vehicle state is in the over steer state (or the spinning state), i.e. the vehicle state is either in the over steer region OA1, OA2, or in the spinning region SA1, SA2 as shown in the driving diagram of FIG. 4, and the operation proceeds to step S2v.

At step S2v, the correcting section 22 selects an angle difference threshold value βfr1 (S2v) from the characteristics data of a turn angle signal δ—an angle difference threshold value βfr1 (FIG. 7), based on the turn angle signal δ from the turn angle sensor 10, and the operation proceeds to step S2d.

Meanwhile, when the direction P of the angle difference signal βfr and the direction N of the yaw rate signal Y coincide with each other, the correcting section 22 compares the direction P of the angle difference signal βfr from the sip angle difference predicting section 21 with a direction S of a steering torque signal T from the steering torque sensor 12 (S2o). For example, when the yaw rate Y is in the counter-clockwise direction (left turn direction), the steering torque T is in the clockwise direction (right turn direction), and the rear wheel slip angle βr in the counterclockwise direction is greater than the front wheel slip angle βf in the counter-clockwise direction (i.e. excessive counter steering state), the direction N of the yaw rate signal Y becomes negative (minus), the direction S of the steering torque signal T becomes positive (plus), and the direction P of the angle difference signal βfr becomes negative (minus). When the yaw rate Y is in the clockwise direction (right turn direction), the steering torque T is in the clockwise direction (right turn direction), and the front wheel slip angle βf in the counter-clockwise direction is greater than the rear wheel slip angle βr in the counterclockwise direction (i.e. the vehicle behavior is in the under steer state), the direction N of the yaw rate signal Y becomes positive (plus), the direction S of the steering torque signal Y becomes positive (plus), and the direction P of t he angle difference signal βfr becomes positive (plus).

When the direction P of the angle difference signal βfr and the direction S of the steering torque signal T do not coincide with each other, the correcting section 22 determines that the vehicle state is in the excessive counter steering state, and the operation proceeds to step S2p.

Meanwhile, when the direction P of the angle difference signal βfr and the direction S of the steering torque signal T coincide with each other, the correcting section 22 selects an angle difference threshold value βfr1 (S2b) from the characteristics data of a turn angle signal δ—an angle difference threshold value βfr1 shown in FIG. 7, based on the turn angle signal δ from the turn angle sensor 10.

The correcting section 22 then compares the absolute value of the angle difference signal |βfr| with the absolute value of the angle difference threshold value |βfr1| (S2c). If the absolute value of the angle difference threshold value |βfr1| is greater than the absolute value of the angle difference signal |βfr|, the correcting section 22 determines that the vehicle state is in the over steer shifting state, i.e. the over steer shifting region TA1, TA2 in the driving diagram shown in FIG. 4, and the operation proceeds to step S2d. At step S2d, the correcting section 22 calculates the absolute value of the angle difference signal |βfr| from the angle difference signal βfr and the angle difference threshold value βfr1 by the equation |βfr|=|βfr−βfr1| (S2d).

Meanwhile, when the absolute value of the angle difference threshold value |βfr1| is less than the absolute value of the angle difference signal |βfr|, the correcting section 22 selects an angle difference threshold value βfr2 (S2e) from the characteristics data of a turn angle signal δ—an angle difference threshold value βfr2 (FIG. 8), based on the turn angle signal δ, so as to determine whether the vehicle behavior is either in the under steer region UA1, UA2 or in the drift out region DA1, DA2 in the driving diagram shown in FIG. 4.

The correcting section 22 then calculates the absolute value of the angle difference signal |βfr| from the angle difference signal βfr and the angle difference threshold value βfr2 by the equation |βfr|=|βfr−βfr2| (S2f).

After judging each condition of the vehicle, the correcting section 22 then selects a correction amount in accordance with each vehicle state. If the over steer state is determined at the step S2a or the over steer shifting state is determined at the step S2c, the correcting section 22 selects an over steering correction amount DO (S2g) from the characteristics of the absolute value of an angle difference signal |βfr|—an over steering correction amount DO shown in FIG. 9, based on the absolute value of the angle difference signal |βfr|.

If determined as the excessive counter steering state at step S2o, the correcting section 22 selects a counter steering correction amount DC (S2p) from the characteristics of the absolute value of an angle difference signal |βfr|—a counter steering correction amount DC shown in FIG. 11, based on the absolute value of the angle difference signal |βfr|. When the counter steer state becomes excessive, the vehicle tends to divert from the straight line off from its radial direction. Therefore, the target torque signal IMO is corrected so as to inform the driver of excessive counter operation via the road reaction force.

Further, when the absolute value of the angle difference signal |βfr| is set at the step S2f, the correcting section 22 selects an under steering correction amount DU (S2h) from the characteristics of the absolute value of an angle difference signal |βfr|—an under steering correction amount DU shown in FIG. 10, based on the absolute value of the angle difference signal |βfr|.

After the over steering correction amount DO or the counter steering correction amount DC has been selected, the correcting section 22 then compares a direction D of an angle difference change amount signal Dv (=dβfr/dt) with the direction S of the steering torque signal T (S2q). The direction D of the angle difference change amount signal Dv is determined to be positive (plus) when the angle difference signal βfr is positive (plus) and the absolute value of the angle difference signal |βfr| increases, whereas the direction D of the angle difference change amount signal Dv is determined to be negative (minus) when the absolute value of the angle difference signal |βfr| decreases. Meanwhile, the direction D of the angle difference change amount signal Dv is determined to be positive (plus) when the angle difference signal βfr is negative (minus) and the absolute value of the angle difference signal |βfr| increases, whereas the direction D of the angle difference change amount signal Dv is determined to be negative (minus) when the absolute value of the angle difference signal |βfr| decreases. For example, when the steering torque signal T is in the clockwise direction (right turn direction), and the rear wheel slip angle βr in the counterclockwise direction is greater than the front wheel slip angle βf in the counterclockwise direction, and further the rear wheel slip angle βr in the counterclockwise direction increases, the direction S of the steering torque signal T becomes positive (plus), the direction P of the angle difference signal βfr becomes negative (minus), and the direction D of the angle difference change amount signal Dv becomes positive (plus). In this instance, because the over steer state shifts toward the diverging direction, a more extensive counter steering operation is required. To this end, the correcting section 22 corrects the target torque signal IMO by adding a correction amount so as to inform the driver of a small road reaction force via the steering wheel 2, thereby urging a counter steering operation. Meanwhile, when the steering torque signal T is in the clockwise direction (right turn direction), and the rear wheel slip angle βr in the counterclockwise direction is greater than the front wheel slip angle βf in the counterclockwise direction, and further the rear wheel slip angle βr in the counterclockwise direction decreases, the direction S of the steering torque signal T becomes positive (plus), the direction P of the angle difference signal βfr becomes negative (minus), and the direction D of the angle difference change amount signal Dv becomes negative (minus). In this instance, because the over steer state shifts toward the converging direction, no more counter steering operation is required. To this end, the correcting section 22 corrects the target torque signal IMO by subtracting a correction amount so as to inform the driver of a large road reaction force via the steering wheel 2. Therefore, when the direction D of the angle difference change amount signal Dv and the direction S of the steering torque signal T coincide with each other, the operation proceeds to step S2s for the purpose of adding-correction of the target torque signal IMO. Further, when the direction D of the angle difference change amount signal Dv and the direction S of the steering torque signal T do not coincide with each other, the operation proceeds to step S2s for the purpose of subtracting-correction of the target torque signal IMO.

At step S2r, the correcting section 22 generates an over steering correction amount signal IDO or a counter steering correction amount signal IDC (S2r) by multiplying the over steering correction amount DO or the counter steering correction amount DC by the vehicle speed coefficient Kr and the angle difference change coefficient Kv. If the operation has been proceeded from the step S2g to the step S2q, the over steering correction amount DO is selected, whereas if the operation has been proceeded from the step S2p to the step S2q, the counter steering correction amount DC is selected.

At step S2s, the correcting section 22 generates an over steering correction amount signal IDO, a counter steering correction amount signal IDC, or an under steering correction amount signal IDU (S2s) by multiplying the over steering correction amount DO, the counter steering correction amount DC, or the under steering correction amount DU by the vehicle speed coefficient Kr and the angle difference change coefficient Kv. If the operation has been proceeded from the step S2g to the step S2q, the over steering correction amount DO is selected, and if the operation has been proceeded from the step S2p to the step S2q, the counter steering correction amount DC is selected, and further if the operation has been proceeded from the step S2h to the step S2s, the under steering correction amount DU is selected.

Further, the correcting section 22 generates a yaw rate correction amount signal IY (S2k, S2l) by multiplying the yaw rate signal Y from the yaw rate sensor 9 by the yaw rate coefficient G2.

Finally, in a case of adding-correction, the correcting section 22 adds the over steering correction amount signal IDO or the counter steering correction amount signal IDC and the yaw rate correction amount signal IY to the target torque signal IMO, and outputs the target torque signal IMH (=Target torque signal IMO+((Over steering correction amount signal IDO or Counter steering correction amount signal IDC)+Yaw rate correction amount signal IY)) to the difference calculating section 23 (S2t), so as to inform the driver of a small road reaction force via the steering wheel 2, thereby urging a further counter steering operation.

Meanwhile, in a case of subtracting-correction, the correcting section 22 subtracts the over steering correction amount signal IDO, the counter steering correction amount signal IDC, or the under steering correction amount signal IDU, and the yaw rate correction amount signal IY from the target torque signal IMO, and outputs the target torque signal IMH (=Target torque signal IMO−((Over steering correction amount signal IDO, Counter steering correction amount signal IDC, or Under steering correction amount signal IDU)+Yaw rate correction amount signal IY)) to the difference calculating section 23 (S2u), so as to inform the driver of a large road reaction force via the steering wheel 2.

According to the electric power steering apparatus 1 provided with the aforementioned correcting section 22, because the vehicle behavior can be determined based on the angle difference signal βfr and the steering torque signal T, the excessive counter steering state can be judged, other than the operations of the first embodiment. Further, because the electric power steering apparatus 1 determines the vehicle state based on the angle difference change amount signal Dv and the steering torque signal T, an accurate judgement can be made as to whether the counter steering operation amount is large or small. Therefore, the electric power steering apparatus 1 can urge the driver to initiate a steering operation in accordance with the respective vehicle states.

While the invention has been described in detail and with reference to specific embodiments thereof, it will be apparent to one skilled in the art that various changes and modifications can be made therein without departing from the spirit and scope thereof.

For example, instead of the above vehicle behavior control apparatus, which is applied to an electric power steering apparatus, and which informs the driver of an accurate road reaction force so as to urge the optimum steering operation in respect to each vehicle behavior, the vehicle behavior control apparatus may be applied to a four wheel steering apparatus and the like so as to directly act on the vehicle and stabilize the vehicle behavior.

Further, a positive/negative direction of the angle difference signal is set to be opposite to that of the turn angle signal and the like. However, these directions may be referred such that the same positive/negative sign indicates the same direction thereof.

What is claimed is:

1. A vehicle behavior control apparatus comprising:

a slip angle difference predicting section for detecting a difference between a slip angle of front wheels and a slip angle of rear wheels;

a steer angle detecting section for detecting a steer angle of the vehicle; and a control section for detecting vehicle state, based on correlation between an angle, difference signal from said slip angle difference predicting section and a steer angle signal from said steer angle detecting section, and for controlling vehicle behavior based on the vehicle state, said control section including a correcting section for receiving the angle difference signal, said control section also including means for connecting said steer angle signal from said steer angle detecting section to said correcting section.

2. A vehicle behavior control apparatus comprising:

a steering torque sensor for detecting a steering torque of a steering system;

an electric motor for applying an assist torque to the steering system;

a control unit having a target torque signal setting section for setting a target torque signal based on a steering torque signal from said steering torque sensor; and a motor driver for driving said electric motor based on said target torque signal, wherein the vehicle behavior control apparatus further comprises a slip angle difference predicting section for detecting a difference between a slip angle of front wheels and a slip angle of rear wheels, and a steer angle detecting section for detecting a steer angle of the vehicle, and said control unit has a correcting section for correcting said target torque signal based on correlation between an angle difference signal from said slip angle difference predicting section and a steer angle signal from said steer angle detecting section, so as to control turning behavior of the vehicle.

3. A vehicle behavior control apparatus according to claim 1, wherein when said control section determines that vehicle behavior is an over steer shifting region, said control section controls vehicle turning behavior to urge a steering operation in a direction where the turn angle decreases.

4. A vehicle behavior control apparatus according to claim 2, wherein when said correcting section determines that vehicle behavior is in an over steer shifting region, said correcting section corrects the target torque signal to urge a steering operation in a direction where the turn angle decreases.

5. A vehicle behavior control apparatus according to claim 1, wherein when said control section determines that vehicle behavior is in a drift out region, said control section controls vehicle turning behavior to urge a steering operation in a direction where turn angle decreases.

6. A vehicle behavior control apparatus according to claim 2, wherein when said correcting section determines that vehicle behavior is in a drift out region, said correcting section corrects the target torque signal to urge a steering operation in a direction where the turn angle decreases.

* * * * *